(12) United States Patent
Hartmann

(10) Patent No.: US 12,173,811 B2
(45) Date of Patent: Dec. 24, 2024

(54) BALL VALVE WITH MONITORING CHAMBER

(71) Applicant: Werner Hartmann GmbH & Co. KG, Celle (DE)

(72) Inventor: Christian Hartmann, Celle (DE)

(73) Assignee: WERNER HARTMANN GMBH & CO. KG, Celle (DE)

( * ) Notice: Subject to any disclaimer, the term of this patent is extended or adjusted under 35 U.S.C. 154(b) by 0 days.

(21) Appl. No.: 18/579,957

(22) PCT Filed: Jun. 23, 2022

(86) PCT No.: PCT/EP2022/067212
§ 371 (c)(1),
(2) Date: Jan. 17, 2024

(87) PCT Pub. No.: WO2023/001483
PCT Pub. Date: Jan. 26, 2023

(65) Prior Publication Data
US 2024/0240731 A1      Jul. 18, 2024

(30) Foreign Application Priority Data

Jul. 21, 2021   (DE) .................... 10 2021 118 883.0

(51) Int. Cl.
*F16K 37/00* (2006.01)
*F16K 5/06* (2006.01)
*F16K 27/06* (2006.01)

(52) U.S. Cl.
CPC ........ *F16K 37/0083* (2013.01); *F16K 5/0689* (2013.01); *F16K 27/067* (2013.01)

(58) Field of Classification Search
CPC .... F16K 5/0689; F16K 5/0678; F16K 27/067; F16K 37/0075; F16K 37/0083; F16K 37/0091
(Continued)

(56) References Cited

U.S. PATENT DOCUMENTS 2,764,891 A   10/1956   Mcgowen, Jr.
3,386,461 A    6/1968   Fisher
(Continued)

FOREIGN PATENT DOCUMENTS

DE   1 209 381 B    1/1966
DE   76 33 265 U1   3/1977
(Continued)

OTHER PUBLICATIONS

International Preliminary Report on Patentability for Application No. PCT/EP2022/067212 dated Jan. 18, 2024 with English translation.

(Continued)

*Primary Examiner* — Michael R Reid
(74) *Attorney, Agent, or Firm* — Carter, DeLuca & Farrell LLP

(57) ABSTRACT

A ball valve has a valve housing (10), a lock chamber (12), a ball plug (22) rotatably mounted in the lock chamber (12), at least one main channel inflow section (18a), at least one main channel outflow section (18b), main channel sealing elements (28a, 28b), and additional sealing elements (30a, 30b, 30a', 30b'). The ball plug has a through opening (24) oriented transversely to the axis of rotation and is rotatably arranged via an actuator (26) so that the ball plug (22) can be brought into at least one open position and into at least one closed position. A monitoring chamber (32) sealed in the closed position of the ball plug (22) is formed within the lock chamber (12) for monitoring proper functioning of the main channel sealing elements (28a, 28b).

10 Claims, 4 Drawing Sheets

Figure 1:
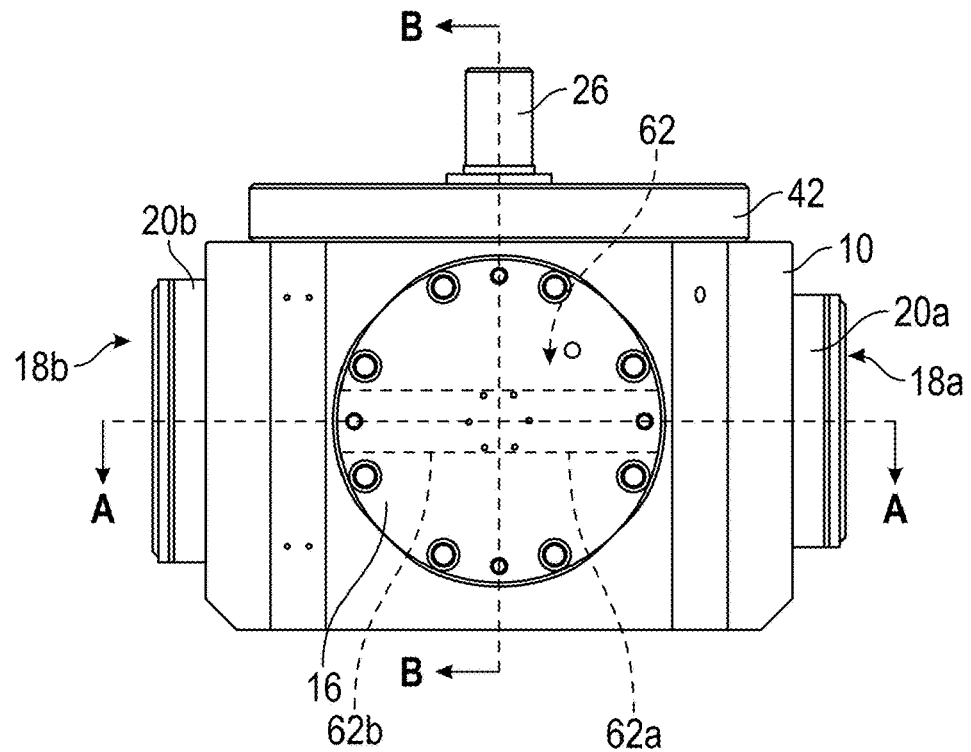

(58) Field of Classification Search
USPC .................................................. 251/315.14
See application file for complete search history.

(56) References Cited

U.S. PATENT DOCUMENTS

| | | | | |
|---|---|---|---|---|
| 3,647,179 | A | * | 3/1972 | Scaramucci ......... F16K 27/067 |
| | | | | 251/367 |
| 3,938,544 | A | | 2/1976 | Bernaerts |
| 4,137,936 | A | | 2/1979 | Sekimoto et al. |
| 5,676,347 | A | * | 10/1997 | Knox ..................... F16K 5/201 |
| | | | | 251/170 |
| 6,669,171 | B1 | * | 12/2003 | Stunkard .............. F16K 5/0673 |
| | | | | 251/315.08 |
| 8,141,843 | B2 | | 3/2012 | Rimboym et al. |
| 2015/0377366 | A1 | | 12/2015 | Hartman et al. |

FOREIGN PATENT DOCUMENTS

| | | |
|---|---|---|
| DE | 35 12 163 A1 | 10/1986 |
| DE | 40 03 864 A1 | 8/1991 |
| DE | 10 2008 020 975 B4 | 12/2016 |
| EP | 0991886 A1 | 4/2000 |
| EP | 1322929 A1 | 7/2003 |
| EP | 1959176 B1 | 12/2009 |
| WO | 02075267 A1 | 9/2002 |
| WO | 9900619 A1 | 7/2003 |

OTHER PUBLICATIONS

International Search Report and Writtten Opinion for application No. PCT/EP2022/067212 dated Oct. 11, 2022, 11 pages.
German Search Report for application No. 10 2021 118 883.0 with English translation dated Jul. 21, 2021, 16 pages.

* cited by examiner

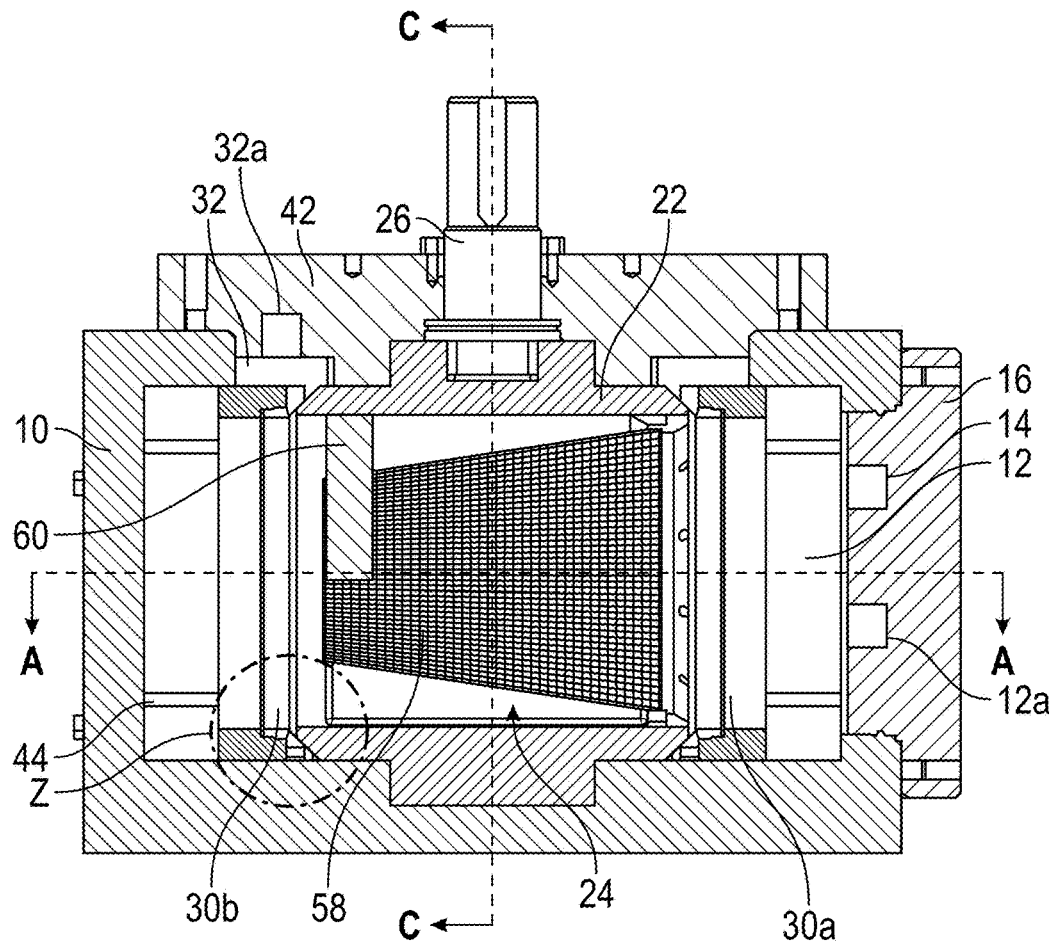
FIG. 5
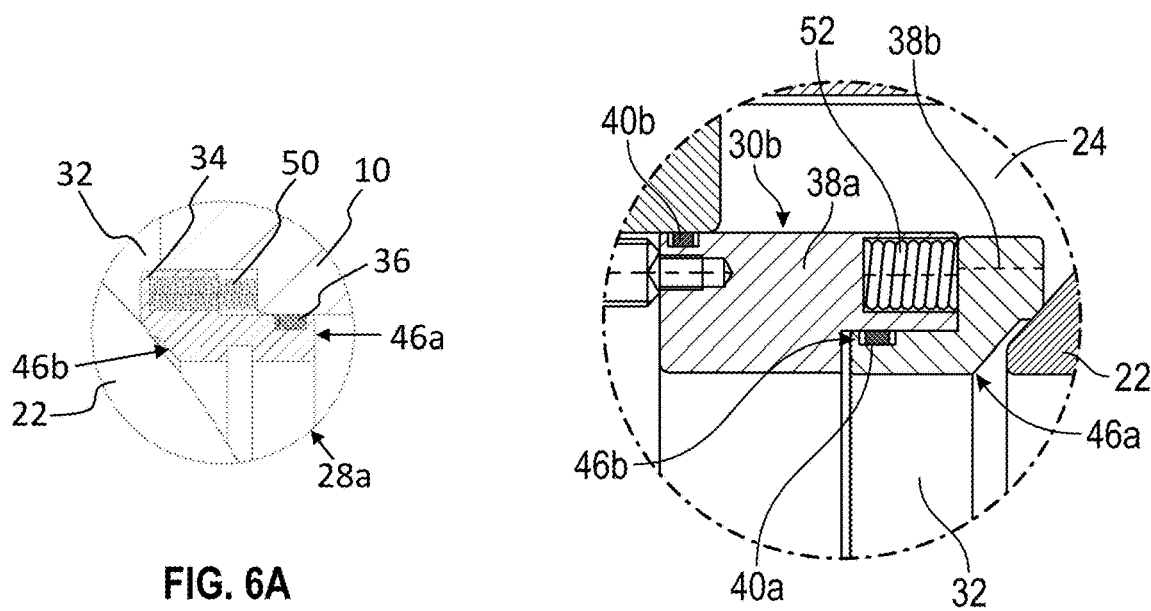
FIG. 6A
FIG. 6B

BALL VALVE WITH MONITORING CHAMBER

The present invention relates to a ball valve having a valve housing; a lock chamber for locking in objects or media as required; a ball plug rotatably mounted in the lock chamber, which ball plug has a through opening oriented transversely to the axis of rotation and an actuator which is rotatably arranged in such a way that the ball plug can be brought into at least one open position and into at least one closed position; at least one main channel inflow section and at least one main channel outflow section for integrating the ball valve into a fluid line, wherein, in the open position of the ball plug, the main channel inflow section and the main channel outflow section are connected by the through opening so that flow can pass through them and, in the closed position of the ball plug, the main channel inflow section and the main channel outflow section are fluidically separated or the flow from the main channel inflow section into the main channel outflow section is at least throttled by means of at least one bypass, while the through opening is accessible from the outside via the lock chamber; and main channel sealing elements by means of which, when the ball plug is in the closed position, the lock chamber is sealed off from the main channel inflow section and the main channel outflow section.

Ball valves are known from practice and are thus state of the art. A ball valve having the above-mentioned features is known, for example, from document DE 40 03 864 A1. The ball valve disclosed therein is designed as a pig valve and has a valve housing with a main channel inflow section and a main channel outflow section, which are aligned with each other and are referred to as two connecting pieces. The valve housing further comprises a third, lateral connecting piece of a lock chamber referred to as a pig trap. A ball plug is mounted in the valve housing, which ball plug is provided with a through bore and is sealed via main channel sealing elements referred to as sealing rings held in seat rings.

In the case of the ball valve known from the prior art, there is as a rule an operating risk for an operator who opens a closure to the lock chamber in order to introduce objects or media into a fluid line connected to the ball valve. This is because if the main channel sealing elements, by means of which the lock chamber is sealed off from the main channel inflow section and the main channel outflow section when the ball plug is in the closed position, do not or no longer fulfil their function properly, the fluid in the fluid line can pass the main channel sealing elements and unexpectedly exert a high pressure on the lock chamber and the closure to be opened via the lock chamber. In this case, when an operator opens the lock, fluid under high pressure can exit from the lock chamber and impact on the operator. It is also possible for the fluid to carry along objects located in or on the fluid line or the lock chamber, and for these objects to injure the operator.

In practice, the operating risk described above is often reduced by the fact that sensors, by means of which a fluid in the lock chamber can be detected, are arranged in the lock chamber. However, it is problematic that such sensors can fail, so that an operator receives wrong information about the operating risk. In addition, as a rule such sensors reliably reduce the operating risk only when the lock chamber is closed with the closure. In practice, this operating risk is partly reduced by additional mechanical safety devices, by means of which opening of the closure to the lock chamber is prevented when there is excess pressure in the lock chamber.

There is an increased operating risk especially when the lock chamber is open, because it is possible for the main channel sealing elements to spontaneously fail when the lock chamber is open. In this case, even if the above sensors function properly, as a rule the operator does not have enough time to close the closure to the lock chamber or to seek shelter due to the frequently high pressure of the fluid in the fluid line.

The invention is therefore based on the task of providing a ball valve which further reduces the operating risk for an operator of the ball valve and which has a constructively simple design.

The task is solved according to the invention with the features of the independent claim. Further practical embodiments and advantages of the invention are described in connection with the dependent claims.

The ball valve according to the invention comprises a valve housing, a lock chamber for locking in objects or media as required, a ball plug rotatably mounted in the lock chamber, which ball plug has a through opening oriented transversely to the axis of rotation and is rotatably arranged via an actuator in such a way that the ball plug can be brought into at least one open position and into at least one closed position. Furthermore, the ball valve comprises at least one main channel inflow section and at least one main channel outflow section for integrating the ball valve into a fluid line. In the open position of the ball plug, the main channel inflow section and the main channel outflow section are connected so that flow can pass through them by means of the through opening, and in the closed position of the ball plug they are separated fluidically, or the flow from the main channel inflow section into the main channel outflow section is at least throttled via at least one bypass, while the through opening is accessible from the outside via the lock chamber. Furthermore, the ball valve according to the invention is provided with main channel sealing elements, by means of which the lock chamber is sealed off from the main channel inflow section and the main channel outflow section when the ball plug is in the closed position.

The lock chamber is accessible via at least one opening from outside the valve housing for locking in objects or media into the fluid line as required. The term "locking in" not only refers to the introduction of objects that subsequently "move along" together with a fluid flowing through the valve housing, but also to the introduction of objects into the valve housing that then remain in the valve housing. Only by way of example is reference made in this respect to the introduction of filter elements, measurement instrumentation or other elements. It is also possible to lock out objects or media from the fluid line via the opening for the introduction of objects or media, i.e. to remove them from the valve housing. For the purpose of locking in objects or media into the fluid line or locking them out of the fluid line by means of the ball valve according to the invention, the ball valve is designed in such a way that the at least one main channel inflow section formed in or on the valve housing and the at least one main channel outflow section also formed in or on the valve housing are connected to each other in such a way that flow can pass through them via the lock chamber when the ball plug is in the open position or when the ball plug has been removed from the valve housing.

Through the at least one main channel inflow section, a fluid can flow into the ball valve from a section, arranged upstream of the ball valve, of the fluid line into which the ball valve is integrated. It is also possible for a plurality of upstream sections of one or more fluid lines to be connected to a plurality of main channel inflow sections of the ball valve in a manner allowing flow therethrough.

Through the at least one main channel outflow section, a fluid can flow from the ball valve into a section, arranged downstream of the ball valve, of the fluid line into which the ball valve is integrated. It is also possible for a plurality of downstream sections of one or more fluid lines to be connected to a plurality of main channel outflow sections of the ball valve in a manner allowing flow therethrough.

The ball plug mounted in the lock chamber externally has at least partially the shape of a sphere. The ball plug deviates from the spherical shape in particular due to the passage opening, and the ball plug can also deviate from the shape of a sphere in the area where the ball plug is mounted in the ball valve. Depending on the position of the ball plug in the lock chamber, sections of the spherical surface cover either the at least one main channel inflow section and the at least one main channel outflow section or at least the opening for locking in objects or media as required.

Due to the ball plug being mounted rotatably, a plurality of different positions of the ball plug can be set. These different positions differ essentially in the orientation of the through opening formed in the ball plug and the orientation of the spherical surface sections of the ball plug in relation to the lock chamber or the fluid line. The ball plug can be mounted incrementally or steplessly in the lock chamber so that any number of positions of the ball plug can be set. When in one position of the ball plug the at least one main channel inflow section and the at least one main channel outflow section are covered and thus fluidically separated from each other, the ball plug is in the closed position. The through opening in the ball plug oriented transversely to the axis of rotation is then oriented towards the opening for locking in objects or media as required and is thus accessible from the outside via the lock chamber. In the closed position of the ball plug, the main channel sealing elements seal off the lock chamber from the main channel inflow section and the main channel outflow section. For this purpose, the main channel sealing elements cooperate in particular with the valve housing. In addition, the main channel sealing elements can also cooperate with the ball plug being in the closed position.

When in one position of the ball plug the at least one main channel inflow section and the at least one main channel outflow section are not covered by the sections of the spherical surface of the ball plug but are connected in a manner allowing flow therethrough, the ball plug is in an open position in which the opening for locking in objects or media as required is covered by the spherical surface sections of the ball plug.

It is also possible for the ball valve to have more than one main channel inflow section and/or more than one main channel outflow section. In this case, several open positions can be assumed by the ball plug. For example, if two main channel inflow sections and two main channel outflow sections are provided, the ball plug can be brought into a first open position in which the first main channel inflow section is connected to the first main channel outflow section in a manner allowing flow therethrough. Alternatively, the ball plug can be brought into a second open position in which the second main channel inflow section is connected to the second main channel outflow section in a manner allowing flow therethrough. Further main channel inflow sections and/or main channel outflow sections can also be provided, which can lead to further open positions of the ball plug as described above.

In order to solve the above-mentioned task, the ball valve according to the invention is provided with additional sealing elements in such a way that a monitoring chamber sealed in the closed position of the ball plug is formed within the lock chamber for monitoring proper functioning of the main channel sealing elements. In other words, in the closed position of the ball plug, the lock chamber is divided by the additional sealing elements into two fluidically separated areas, one of these areas serving as a monitoring chamber. The first of the two areas is adjacent to the opening for locking in media and objects as required; the second of the two areas is the monitoring chamber and is arranged between the first area and the main channel sealing elements. If the main channel sealing elements do not functionally seal the lock chamber from the at least one main channel inflow section and the at least one main channel outflow section, part of the fluid will flow from the fluid line into the monitoring chamber.

The monitoring chamber is configured such that the fluid from the fluid line cannot flow past it into the first area of the lock chamber. Since the monitoring chamber can be monitored, an operator of the ball valve according to the invention can receive an advance warning if the main channel sealing elements are not sealing functionally and the fluid is flowing into the monitoring chamber. For example, the monitoring chamber can be monitored by an operator of the ball valve. For this purpose, the monitoring chamber can have a transparent viewing section through which the operator can observe the condition of the monitoring chamber and, in particular, recognize if a (non-transparent) fluid unexpectedly flows into the monitoring chamber.

Alternatively or in addition, the pressure chamber can be provided with a pressure chamber channel and a discharge valve in order to enable determining, by opening the discharge valve and waiting, whether fluid is still continuously entering the pressure chamber due to main channel sealing elements not working properly.

If the operator this way or some other way receives an advance warning that fluid is flowing into the monitoring chamber or the monitoring chamber is filled with fluid while the opening to the lock chamber is closed, the operator may refrain from opening the opening for safety reasons because of the advance warning. Furthermore, in the event that the main channel sealing elements suddenly fail while the monitoring chamber is open, the operator has sufficient time to close the opening and/or move away from the malfunctioning ball valve before the fluid flows out of the ball valve because the additional sealing elements retain the fluid in the ball valve.

It is pointed out that the valve housing of a ball valve according to the invention can be of one-piece design or multi-piece design. In particular, reference is made to a one-piece design of the valve housing with an opening on its upper side and a cover provided therefor, to a two-piece design wherein the valve housing is formed by two housing elements (e.g. by a main housing element and a smaller housing element, in particular a moulded cover), and to a three-piece design, in particular with two lateral housing elements or covers.

In a suitable improved embodiment of the ball valve, the main channel inflow section, the main channel outflow section and the lock chamber are arranged in the valve housing and the lock chamber is oriented orthogonally to the at least one main channel inflow section and/or the at least one main channel outflow section. When the main channel inflow section, the main channel outflow section and the lock chamber are arranged in the valve housing, the ball valve has an overall compact design and a high mechanical stiffness. This is of particular importance for an integration of the ball valve into high-pressure fluid lines. If the main channel inflow section and the main channel outflow section are not arranged in the valve housing, but are connected to it externally, for example by a joining process, the high pressure of the fluid can cause damage to the joining seams. The orthogonal orientation of the lock chamber to the at least one main channel inflow section and/or the at least one main channel outflow section is a particularly simple design of the ball valve and allows it to be manufactured in a simple manner. Furthermore, this way, particularly large flow cross-sections of the lock chamber, the main channel inflow section and the main channel outflow section can be achieved. In addition or alternatively, there is a large angle of rotation between the open position and closed position of the ball plug, so that the likelihood of unwanted opening of the ball valve is reduced and a large travel distance is available for more precise control of the process.

For the sake of completeness, it is pointed out that individual elements, in particular a lock channel formed transversely to a main channel, can be formed as separate elements and connected to the valve housing in a suitable manner. Thus, for example, a separate lock connecting piece with a lock closure can be welded or screwed to the valve housing from the outside.

In a further practical embodiment of the ball valve, the additional sealing elements can be arranged at least in the lock chamber and/or at the boundary of the lock chamber to the main channel inflow section and the main channel outflow section.

If the additional sealing elements are arranged in the lock chamber, the monitoring chamber can advantageously be large. In this case, a larger amount of fluid can flow from the fluid line into the monitoring chamber if the main channel sealing elements are damaged and a longer period of time elapses until the monitoring chamber is filled and the pressure of the fluid acts completely on the additional sealing elements. Furthermore, the main channel sealing elements and the additional sealing elements may be particularly far apart in this case. If the sealing elements are in contact with the ball plug and the spherical surface of the ball plug is contaminated with particles, this arrangement can prevent the contaminants that can cause damage to one of the main channel sealing elements or one of the additional sealing elements from also causing damage to the additional sealing elements or the main channel sealing elements. This is because these contaminants then only come into contact with one of the sealing elements or at least at different points of the sealing elements.

If the additional sealing elements are arranged in the area at the boundary of the lock chamber to the main channel inflow section and the main channel outflow section, the monitoring chamber is small as compared to the embodiment last described. This results in other advantages than those mentioned above. In particular, only slightly modified prior art valve housings can then be used to form the additional monitoring chamber. Furthermore, in the event of a sealing element no longer functioning properly, a pressure increase can then be detected more quickly due to a smaller volume, which is particularly relevant if the leakage is small.

It is pointed out that by a combination of the two embodiments described above or a multiple realization of one embodiment, it is also possible to form a ball valve with two or more monitoring chambers.

In addition or alternatively, monitoring means for monitoring the condition of the monitoring chamber may be provided. For example, a sound sensor, a pressure sensor and/or an optical sensor may be provided as monitoring means. Any other monitoring means suitable for the invention may also be used for monitoring the monitoring chamber.

The propagation of sound waves, measured by means of a sound sensor, as well as the pressure, measured by means of a pressure sensor, and the absorption or reflection of light waves, measured by an optical sensor, in the monitoring chamber are essentially dependent on the monitoring chamber being filled with a fluid. All of the aforementioned sensors are known from the prior art and are suitable for converting a measurement signal into an electrical signal. The electrical signal can be compared with a target value by means of a computing unit. If the measured value exceeds or falls below the target value, an optical or acoustic warning signal can be output to the operator, indicating that there is fluid in the monitoring chamber. By using such monitoring means, safety for the operator is further increased, as they do not have to actively check the monitoring chamber.

A channel leading from the monitoring chamber through the valve housing to the outside can also be provided as a monitoring means. Such a channel can either be used for pressure monitoring or alternatively be filled with a sealant injection, wherein the sealant is preferably designed in such a way that it leaks from the channel when a predetermined pressure is exceeded, so that it is apparent to an operator that there is increased pressure in the monitoring chamber and accordingly the lock closure should be closed as quickly as possible if it is open.

Alternatively or in addition, a sealant can also be arranged within the pressure chamber and selected in such a way that the sealant creates an emergency seal in the event of a leak. In particular, it is possible to close any damaged area of a sealing element in the closed stationary case by injection and curing or—if viscosity is sufficiently high—exclusively by injection into the pressure chamber. However, actuating the valve would then cause the emergency seal to fail.

In practice, the valve housing may comprise a housing cover and/or a lock closure for closing the lock chamber. The housing cover may close a second opening to the lock chamber optionally arranged in the valve housing. The second opening may be provided, for example, for easily inserting the ball plug into the lock chamber and/or for performing maintenance work on the ball valve. For this purpose, the housing cover can be non-positively and/or positively connected to the valve housing and can be removable when required.

The lock closure is particularly important if the opening for locking in media or objects as required must itself be closable. This is necessary, for example, if the ball valve is not connected via the lock chamber to a closable line for feeding media or objects to the ball valve as required.

In another practical embodiment of the ball valve, the main channel sealing elements and/or the additional sealing elements can each have at least one metallic seat ring and/or an elastic sealant. An elastic sealant can, for example, be arranged in a groove surrounding the seat ring. In particular, the elastic sealant can be an O-ring. The seat rings with the elastic sealants can be arranged between the ball plug and the valve housing in such a way that a sealing effect is achieved by cooperation of the ball plug, the valve housing and the respective seat ring with the elastic sealant. In this case, the elastic sealant can be in contact with the valve body and/or the ball plug. It is also possible for the main channel sealing elements and/or the additional sealing elements not to be in contact with the ball plug via the elastic sealant, but via the metallic seat ring. As a rule, ball valves having such sealing elements are called metallic sealing ball valves. These are characterized by an advantageous combination of high sealing performance and low contact wear of the sealing elements.

Reference is made to the fact that the main channel sealing elements and/or the additional sealing elements can also have several elastic sealants and/or several metallic seat rings, which are arranged in a suitable manner engaging with each other or in contact with each other and are thus, for example, supported against each other. This can further increase the sealing performance of the sealing elements and/or facilitate assembly of the ball valve.

If both the main channel sealing elements and the additional sealing elements are designed as metallic seat rings having elastic sealants, it is particularly advantageous to arrange the additional sealing elements—as described above—at the boundary of the lock chamber to the main channel inflow section and the main channel outflow section. In this case, it is possible to arrange the additional sealing elements next to the main channel sealing elements in such a way that the monitoring chamber is reduced to a narrow gap between one of the main channel sealing elements and one of the additional sealing elements.

In addition or alternatively, the additional sealing elements can be arranged in a movable and lockable manner. In particular, it is advantageous to design the additional sealing elements to be movable and/or lockable if they are arranged in the lock chamber as described above. This is because a sufficiently large space is then available for positioning the additional sealing elements and the ball plug ideally in relation to each other and subsequently locking the additional sealing elements. In this way, a particularly high sealing performance can be achieved. Furthermore, assembly of the ball valve can be simplified if the additional sealing elements are arranged in the lock chamber in a movable and/or lockable manner. This is because it is then possible, in a first step, to introduce the additional sealing elements into a position in the lock chamber in which they do not interfere with a subsequent introduction of the ball plug. In a further step, the additional sealing elements can be pushed towards the ball plug mounted in the intended position. Due to such type of assembly, it is not necessary to place the additional sealing elements and the ball plug into their final positions relative to each other outside the valve housing, introducing them jointly into the valve housing.

Furthermore, in addition or alternatively, active surfaces of the main channel sealing elements and/or active surfaces of the additional sealing elements are designed in such a way that a fluid present at these sealing elements exerts a pressure on the active surfaces, which pressure presses the sealing elements against the ball plug. The term "active surfaces" generally refers to surface areas of the sealing elements that are in contact with a fluid during the intended operation of the sealing elements and that are inclined relative to the spherical surface of the ball plug in such a way that at least one component of these surface areas is aligned substantially parallel to the spherical surface of the ball plug.

In total, those components of the active surfaces parallel to the spherical surface of the ball plug, on which the fluid exerts a pressure in the direction of the ball plug, are greater than those components parallel to the spherical surface of the ball plug, on which the fluid exerts a pressure in the direction opposite to the ball plug. Thus, the resulting force exerted by the fluid on the sealing element over the entirety of the active surfaces of the sealing element is directed in the direction of the ball plug. This resulting force always presses the sealing element against the ball plug and improves the sealing effect by taking advantage of the fluid pressure.

It is also possible for elastic means for pressing the sealing elements against the ball plug to be provided in addition or alternatively.

In a likewise advantageous embodiment of the ball valve, a first pressure influencing channel is connected to the lock chamber, by means of which the lock chamber can be relieved of pressure or pressurized in the closed state of the ball plug. Furthermore, a second pressure influencing channel is connected to the monitoring chamber, by means of which the monitoring chamber can be relieved of pressure or pressurized in the closed state of the ball plug.

The first pressure influencing channel is connected in particular to the first area of the lock chamber, which is adjacent to the opening for locking in media or fluids as required. The two pressure influencing channels have controllable valves that can be opened and closed. When the ball plug is in the closed position and there is a fluid in the lock chamber and/or the monitoring chamber, the fluid can be drained by opening the valves. This relieves the pressure in the respective chamber from which the fluid is drained.

It is also possible to actively pressurize the lock chamber and/or the monitoring chamber. For this purpose, for example, a flow machine can cooperate with the two pressure influencing channels. If a hydrostatic pressure is generated by means of the flow machines and at least one of the two valves on the pressure influencing channels is open, this hydrostatic pressure is applied to the chamber with the open valve.

This design is particularly advantageous if in addition at least one monitoring means for monitoring the pressure is arranged on the flow machine, in the monitoring chamber or in the pressure influencing channel arranged in between. This is because a predetermined pressure can then be set in the monitoring chamber. By setting a predetermined pressure in the monitoring chamber, it is possible to check the operativeness of the additional sealing elements. If the measured, set pressure in the monitoring chamber drops as compared to the predetermined pressure during the measurement, there is a leakage on the additional sealing elements, which can be caused in particular by an additional sealing element that is not or no longer correctly seated or a damaged additional sealing element. An operator can carry out such a check of the additional sealing elements regularly and replace these sealing elements or correct their seating if they are defective. This can further increase the safety of the operator.

In a further embodiment, the ball valve has in particular at least one actuator protruding from the valve housing, a taper in the ball plug formed in the direction of insertion of a pig and/or a strainer in the through opening. The actuator protruding from the valve housing can be easily and releasably connected by means of a positive and/or non-positive connection to a drive for adjusting the position of the ball plug. The formation of a taper in the direction of insertion of a pig has the advantage that the pig is "caught" by means of the taper during insertion and thus correctly positioned within the ball plug, i.e. due to the taper or due to a catching grid inserted in the area of the taper, the pig is kept from penetrating too far through the opening in the ball plug.

The strainer in the through opening can serve as a filter or for collecting objects to be locked out of the fluid line. The strainer is particularly well suited for this purpose because the fluid flowing in the fluid line can flow through it, whereas particles, contaminants and/or objects flowing with the fluid are caught by it.

The ball valve is preferably designed as a pig valve and/or is configured for at least one of the following parameter ranges:
nominal width of the fluid line: 0.5 inch to 56 inches;
pressure in the fluid line: 0.1 to 1,500 bar;
temperature of the fluid in the fluid line: −200° C. to +650° C.

Figure 2:
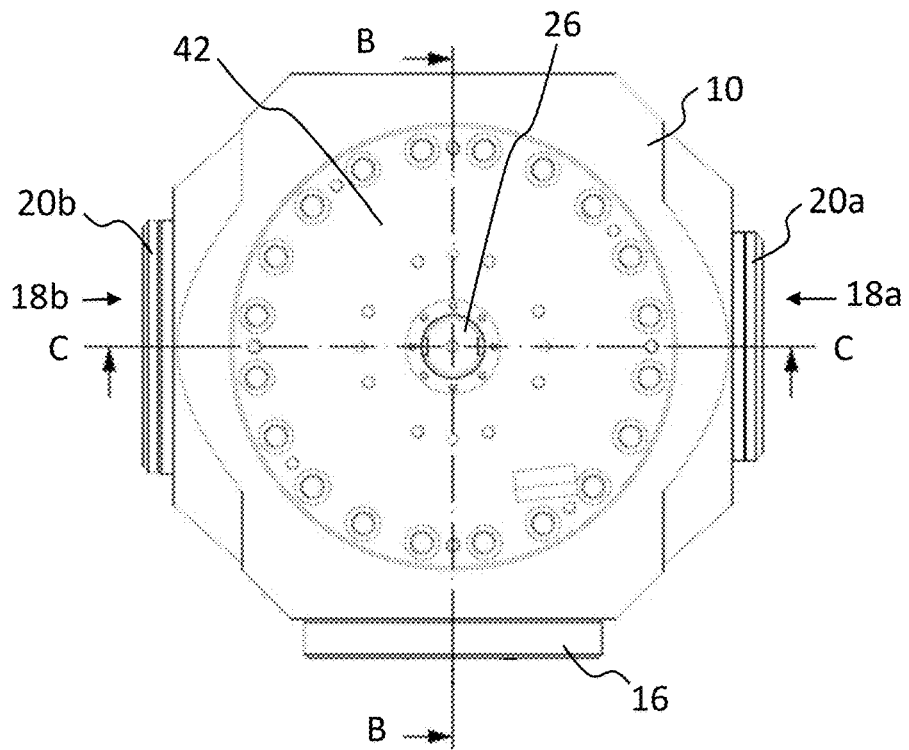
Figure 3:
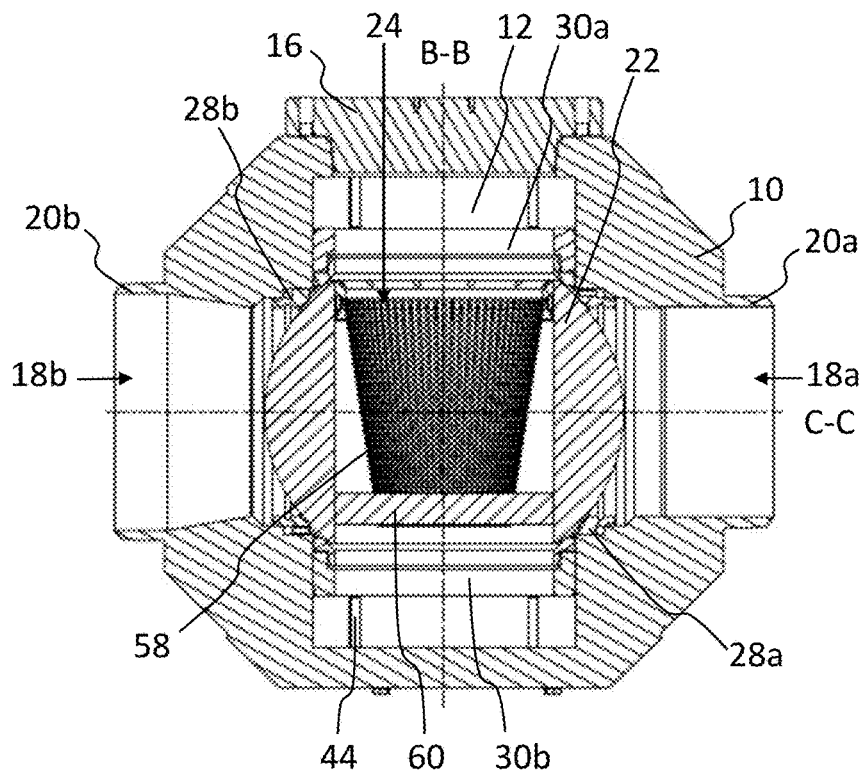
Figure 4:
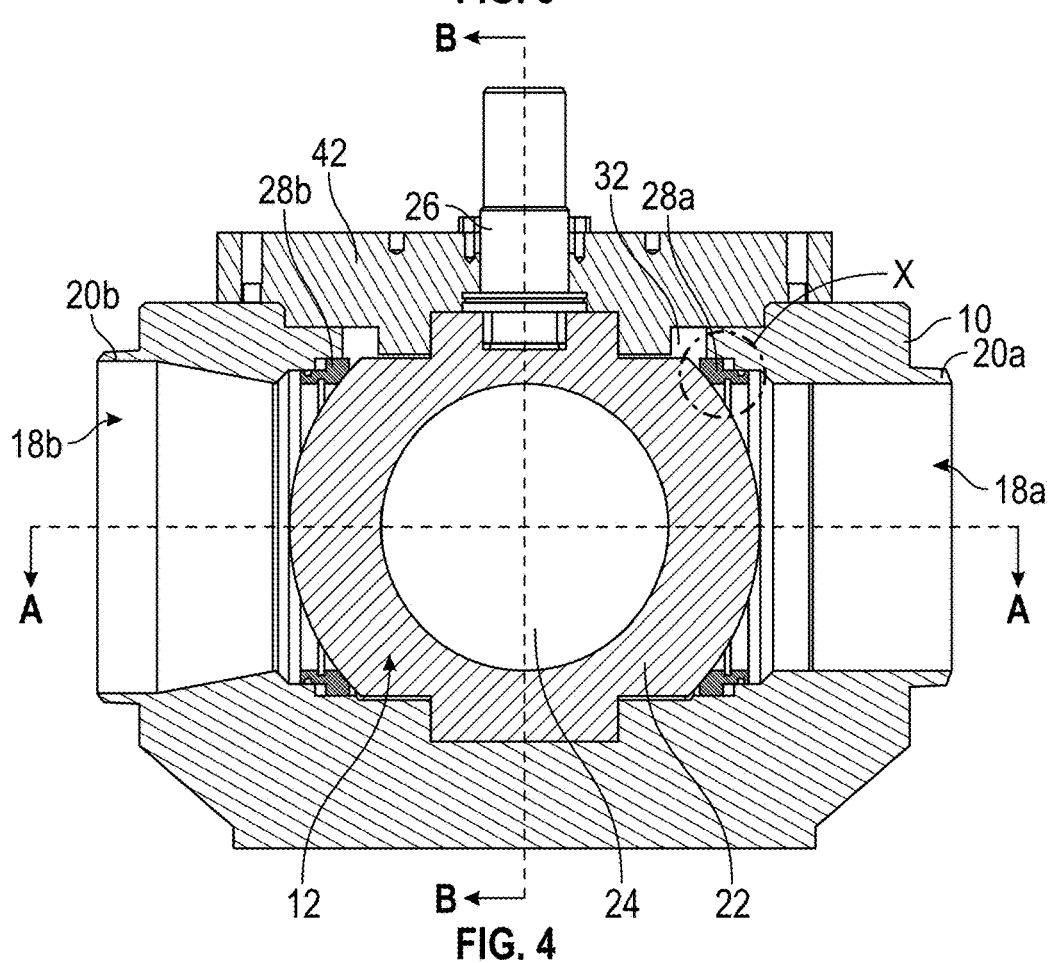
Figure 7:
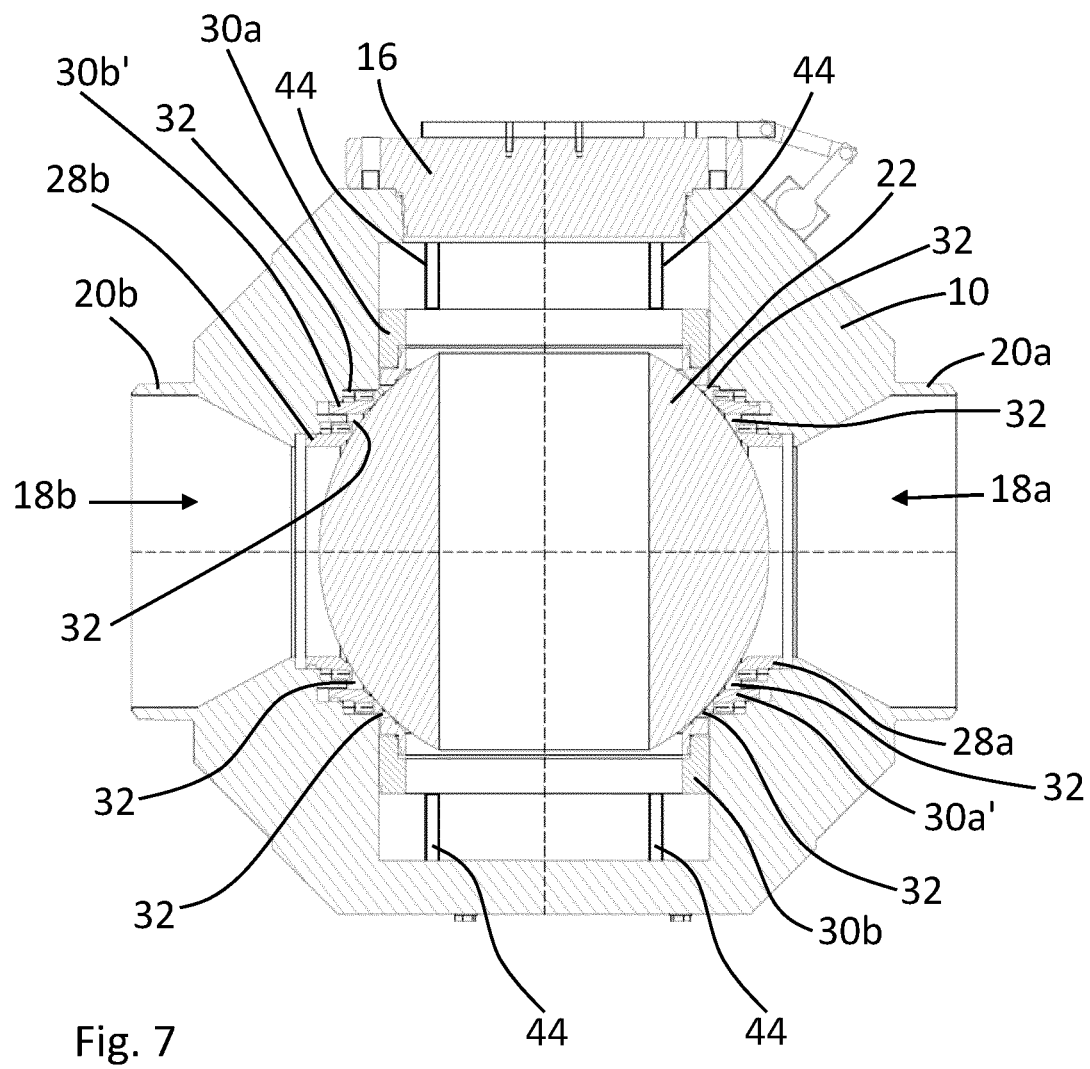

Further practical embodiments and advantages of the invention are described below in connection with the drawings. They show:

FIG. 1 a ball valve according to the invention in a side view of the closed opening for locking in media or objects as required;

FIG. 2 is a top view of the ball valve of FIG. 1;

FIG. 3 the ball valve of FIG. 1 in a view along section line A-A with the ball plug in closed position;

FIG. 4 the ball valve of FIG. 2 in a view along section line C-C with the ball plug in closed position;

FIG. 5 the ball valve of FIG. 2 in a view along section line B-B with the ball plug in closed position;

FIG. 6a a detailed view of section X of the ball valve of FIG. 4;

FIG. 6b a detailed view of section Z of the ball valve of FIG. 5;

FIG. 7 possibilities for several further embodiments of a ball valve according to the invention, in particular with additional sealing elements arranged in the same orientation as the main channel sealing elements.

FIGS. 1 and 2 show an embodiment of the ball valve according to the invention in a side view (FIG. 1) and in a view from above (FIG. 2), each from the outside. The ball valve has a valve housing 10—here of substantially polyhedral design. A lock chamber 12 is formed in the interior (cf. FIG. 3).

The lock chamber 12 is accessible through an opening 14 for locking in media or objects from outside the ball valve as required. In FIGS. 1 and 2, the opening 14 is not visible as it is closed by means of a removable lock closure 16. Furthermore, a main channel inflow section 18a and a main channel outflow section 18b are arranged in the valve housing 10, each having a connecting piece 20a, 20b projecting from the valve housing 10. By means of the connecting pieces 20a, 20b, the ball valve can be integrated into a fluid line (not shown).

FIGS. 3, 4 and 5 show the interior of the ball valve according to section lines A-A, B-B and C-C in FIGS. 1 and 2, respectively. Identical elements of the ball valve are marked with the same reference signs in FIGS. 3-6 as in FIGS. 1 and 2.

In the sectional view of the ball valve shown in FIG. 3, the main channel inflow section 18a and the main channel outflow section 18b, located opposite it and aligned with it, are shown in the centre of the ball valve.

Alternatively, it is also possible for the main channel inflow section 18a and the main channel outflow section 18b to be arranged or formed—in particular slightly—offset to each other and/or have orientations (main flow directions) that are inclined towards each other.

Orthogonally oriented to the main channel inflow section 18a and the main channel outflow section 18b shown in FIG. 3 is the lock chamber 12 with the opening 14 and the lock closure 16. The main channel inflow section 18a and the main channel outflow section 18b open approximately centrally into the lock chamber 12, so that the main channel inflow section 18a, the main channel outflow section 18b and the lock chamber 12 form a crossing section in the valve housing 10. A substantially spherical ball plug 22 is arranged centrally in the lock chamber 12 or in the crossing section. The spherical shape of the ball plug 22 is particularly apparent from a synopsis of FIGS. 3 and 4. The ball plug 22 is in a closed position in FIGS. 3, 4 and 5. In this closed position, a through opening 24 completely penetrating the ball plug 22 is aligned in the direction of the opening 14.

In the closed position of the ball plug 22, a wall of the substantially spherical ball plug 22 surrounding the through opening 24 projects at least partially into the main channel inflow section 18a and into the main channel outflow section 18b in such a way that the main channel inflow section 18a and the main channel outflow section 18b are covered thereby. The main channel inflow section 18a and the main channel outflow section 18b are thus fluidically separated from each other in the closed position of the ball plug 22 shown in FIGS. 3, 4 and 5.

Alternatively, bypass bores 62a, 62b (cf. FIG. 1) can be formed in the ball plug 22 so that a smaller portion of a medium continues to flow through the ball plug 22 from the main channel inflow section 18a into the main channel outflow section 18b. For this purpose, in particular at least one bypass bore 62a from the side of the main channel inflow section 18a and one bypass bore 62b from the main channel outflow section 18b are provided, which meet and thus form a bypass 62. Two or more such bypasses 62 may also be formed. This embodiment is particularly useful for media whose continuous flow is of great importance, as otherwise they solidify or have an unfavourable effect on the over-all process in some other way.

A plurality of sealing elements 28a, 28b, 30a, 30b is arranged adjacent to the ball plug 22 (cf. FIGS. 3 and 4). The sealing elements 28a, 28b are main channel sealing elements. In FIGS. 3 and 4, it can be seen that the main channel sealing elements 28a, 28b are arranged to seal the lock chamber 12 with respect to the main channel inflow section 18a and the main channel outflow section 18b, respectively. For this purpose, the main channel sealing elements 28a, 28b are designed as metallic seat rings with elastic sealants and are arranged between the ball plug 22 and the inner wall of the main channel inflow section 18a or between the ball plug 22 and the inner wall of the main channel outflow section 18b, respectively, in such a way that no fluid can flow from the main channel inflow section 18a or the main channel outflow section 18b past the ball plug 22 into the lock chamber 12. Further details of the main channel sealing elements 28a, 28b are explained below.

The sealing elements 30a, 30b are additional sealing elements by means of which a monitoring chamber 32 is delimited from the lock chamber 12. The lock chamber is thus divided into a first area, which is adjacent to the opening 14, and a second area, which serves as a monitoring chamber 32. The monitoring chamber 32 can be seen in the cross-sectional views of the ball valve shown in FIGS. 4 and 5, substantially to the upper left and right and to the lower left and right of the ball plug 22. The monitoring chamber is not visible in FIG. 3, as the sectional plane shown in FIG. 3 is the equatorial plane of the ball plug, in which the ball plug 22 occupies substantially the entire cross-section of the monitoring chamber 32. The monitoring chamber 32 is designed in such a way that a fluid can only flow into this monitoring chamber 32 if the main channel sealing elements 28a, 28b do not seal properly. Since the additional sealing elements 30a, 30b seal the first area of the lock chamber 12 off from the monitoring chamber 32, the fluid cannot flow from the monitoring chamber 32 into the first area of the lock chamber 12. Thus, there is no danger for an operator of the ball valve even if the main channel sealing elements 28a, 28b fail when the lock closure 16 is open.

In this embodiment, the additional sealing elements 30a, 30b are arranged in a movable and lockable manner in the lock chamber 12. In FIGS. 3 and 5, in addition to the additional sealing elements 30a, 30b, useful spaces can be seen in the lock chamber 12, the size of which corresponds approximately to the size of the additional sealing elements 30a, 30b. In these useful spaces, guide devices 44 are provided, which can be designed, for example, as guide grooves or guide rails. Along the guide devices 44, the additional sealing elements 30a, 30b can be moved from the position shown in FIGS. 3 and 5 into the useful spaces and moved back.

The additional sealing elements 30a, 30b can be introduced into the lock chamber 12 separately from the ball plug 22 through a second opening on the upper region of the valve housing 10, which opening can be closed with a housing cover 42 and is shown in FIGS. 4 and 5, and pushed into the useful spaces. In a further step, the ball plug 22 can also be introduced into the lock chamber 12 through the second opening. Subsequently, the actuator 26 can be non-positively and/or positively connected to the ball plug 22 and the housing cover 42 can be placed from above on the valve housing 10 and the actuator 26 in such a way that the actuator 26 protrudes through the housing cover 42 and the opening on the upper region of the valve housing 10 is closed in a gas-tight manner by the housing cover 42. As a result, the ball plug 22 is securely mounted in the functionally correct position. Subsequently, the additional sealing elements 30a, 30b can be moved along the guide device 44 towards the ball plug 22. This allows the additional sealing elements 30a, 30b to be ideally positioned relative to the ball plug 22. Ideal positioning is achieved when the additional sealing elements 30a, 30b are pressed uniformly against the ball plug 22 and the inner wall of the lock chamber 12, so that a particularly uniform and good sealing performance is achieved. In the ideal position, the additional sealing elements 30a, 30b can finally be securely locked. Due to the design of the ball plug 22 described above and the assembly which can be achieved thanks to it, it is also possible to readjust the positions of the ball plug 22 and the additional sealing elements 30a, 30b in the integrated state of the ball valve in a fluid line.

A first pressure influencing channel 12a (cf. FIG. 5) is connected to the lock chamber 12, by means of which the lock chamber 12 can be relieved of pressure or pressurized in the closed state of the ball plug 22.

A second pressure influencing channel 32a (cf. FIG. 5) is connected to the monitoring chamber 32, by means of which the monitoring chamber 32 can be relieved of pressure or pressurized in the closed state of the ball plug 22.

Alternatively or in addition, it is also possible that the additional sealing elements 30a, 30b are not arranged in the lock chamber at the ball plug 22, as described above, but that the additional sealing elements 30a, 30b are arranged at the boundary area between the lock chamber 12 and the main channel inflow section 18a or at the boundary area between the lock chamber 12 and the main channel outflow section 18b (not shown). The additional sealing elements 30a, 30b are then located on the side of the main channel sealing elements 28a, 28b facing away from the main channel inflow section 18a or the main channel outflow section 18b. In this case, two separate annular monitoring chambers are formed, one of which is adjacent to the area of the main channel inflow section 18a and one of which is adjacent to the area of the main channel outflow section 18b.

In FIGS. 3, 4 and 5, a strainer 58 can be seen in the through opening 24. The outer shape of the strainer 58 corresponds to a truncated cone, the largest diameter of which corresponds approximately to the inner diameter of the through opening 24. At the smallest diameter of the strainer, the strainer is mounted fixed in position against a strainer receptacle 60 in the ball plug 22. When the ball plug 22 is in the open position, liquids and/or gases flowing from the main channel inflow seetion 18a through the ball plug 22 can pass through the strainer 58 arranged in the through opening 24, whereas contaminants, particles and/or objects are collected by the strainer 58. When the ball plug 22 is in the closed position, the strainer 58 and/or the contaminants, particles and/or objects collected by the strainer 58 can be removed via the opening 14.

FIG. 6a shows a possible embodiment of the main channel sealing element 28a. The main channel sealing element 28b is of identical design. FIG. 6a shows that the main channel sealing element 28a can have a metallic seat ring 34, an elastic sealant 36 in the form of an O-ring and a spring 50. The O-ring 36 seals off the main channel sealing element 28a against the valve housing 10. The spring presses the seat ring 34 against the ball plug 22. On the seat ring, active surfaces 46a, 46b, on which the fluid present on the main channel sealing element 28a acts, are designed in such a way that an effective force presses the seat ring 34 against the ball plug 22. For this purpose, the component of the active surface 46a, via which the fluid exerts pressure on the seat ring 34 in the direction of the ball plug 22, is greater than the component of the active surface 46b, via which the fluid exerts pressure on the seat ring 34 in the direction opposite to the ball plug 22.

FIG. 6b shows a possible embodiment of the additional sealing element 30b. The additional sealing element 30a is of identical design. FIG. 6b shows that the additional sealing element 30b can have two metallic seat rings 38a, 38b. The second seat ring 38b of the additional sealing element 30b is supported against the first seat ring 38a of the additional sealing element 30b by means of a spring 52. Furthermore, a first elastic sealant 40a of the additional sealing element 30b, designed as an O-ring, is arranged between the seat ring 38a of the additional sealing element 30b and the second seat ring 38b of the additional sealing element 30b. The second seat ring 38b of the additional sealing element 30b is pressed against the ball plug 22 by the first seat ring 38a of the additional sealing element 30b and the spring 52. Further, between the first seat ring 38a of the additional sealing element 30b and the inner wall of the lock chamber 12, a second elastic sealant 40b, designed as an O-ring, of the additional sealing element 30b is arranged.

The first seat ring 38a of the additional sealing element 30b can be locked in the valve housing 10, for example, by using threaded rods (not shown) which exert pressure from the outside through the valve housing on the first seat ring 38a of the additional sealing element 30b. By designing the additional sealing elements 30a, 30b as described above, a particularly homogeneous pressure can be exerted on the second seat rings 38b of the additional sealing elements 30a, 30b, resulting in a suitable, pressure-matched sealing effect of the additional sealing elements 30a, 30b. In addition, the second seat rings 38b of the additional sealing elements 30a, 30b also have active surfaces 48a, 48b designed such that a fluid acting on these seat rings presses the second seat rings 38b against the ball plug 22.

In FIG. 7, several possibilities for further embodiments are depicted in a drawing, which are explained below.

Herein, the same reference signs as in FIGS. 1-6 are used for identical or at least functionally identical elements.

FIG. 7 shows a valve housing 10 in a sectional view analogous to the illustration in FIG. 3. On the side of the valve housing 10 facing upwards in FIG. 7, a lock closure 16 is arranged which can be opened if required.

In each of the area of the main channel inflow section 18a and the area of the main channel outflow section 18b of the valve housing 10, an inner main channel sealing element 28a, 28b is arranged between the valve housing 10 and the ball plug 22. These can be of one-piece or multi-piece design.

As can be seen in FIG. 7, corresponding main channel additional sealing elements 30a', 30b' are arranged radially somewhat further outside as compared to these main channel sealing elements 28a, 28b. These are designed in such a way that a monitoring chamber 32 each is formed between the main channel sealing elements 28a, 28b and the additional main channel sealing elements 30a', 30b', i.e. a closed pressure chamber into which no fluid can enter when the main channel sealing elements 28a, 28b are functioning properly in the closed position shown in FIG. 7. Accordingly, a monitoring chamber 32 in the sense of the invention is formed between the main channel sealing elements 28a, 28b and the main channel additional sealing elements 30a', 30b'.

In addition, additional sealing elements 30a, 30b are arranged in an orientation transverse to the main flow direction—as in the embodiment shown in FIG. 3—on the side of the valve housing 10 oriented towards the lock closure 16 and on the opposite side of the valve housing 10. If, in addition to the above-mentioned main channel additional sealing elements 30a', 30b', the additional sealing elements 30a, 30b are provided, a further monitoring chamber 32 is formed between these, the ball plug 22 and the valve housing 10.

Thus, two or more monitoring chambers 32 may be provided in a valve housing 10 according to the invention in order to reduce the risk of operating a ball plug 22, in particular while a lock closure (16) is open.

In particular, reference is also made to the following advantageous design variants, which—unless excluded for logical reasons—can be realized individually or in combination.

By an arrangement with main channel sealing elements 28a, 28b and main channel additional sealing elements 30a' and 30b', which, as shown in FIG. 3, are both oriented in the same way and can thus be arranged at a small distance from each other, the volume of the monitoring chamber 32 can be kept small with little constructional effort. This results in a short response time in the event that a sealing element 28a, 28b, 30a', 30b' does not function properly.

All sealing elements 28a, 28b, all main channel additional sealing elements 30a', 30b' and all additional sealing elements 30a, 30b can be of one-piece design or multi-piece design. In the embodiment shown in FIG. 7, the main channel sealing elements 28a, 28b and main channel additional sealing elements 30a', 30b' are each of one-piece design, while the additional sealing elements 30a, 30b are of two-piece design.

Irrespective of the one-piece or multi-piece design, said sealing elements 28a, 28b, 30a', 30b', 30a, 30b are preferably provided with a pretensioning element in order to be pressed with a pretensioning force in the direction of the ball plug 22. This can be achieved in particular by means of a spring 50, 52, by means of an elastomeric element not shown and/or by means of graphite elements.

From the monitoring chamber 32, a channel (not shown) can be formed leading through the valve housing 10 to the outside. This can either be used for pressure monitoring or alternatively be filled with a sealant injection, wherein the sealant is preferably designed in such a way that it leaks from the channel when a predetermined pressure is exceeded, so that it is apparent to an operator that there is increased pressure in the monitoring chamber 32 and accordingly the lock closure 16 should be closed as quickly as possible if it is open.

If—as shown in FIG. 7—several monitoring chambers 32 are provided, it can be advantageous to arrange additional sealing elements 30a, 30b, 30a', 30b' made of different materials one behind the other in a cascade-like manner in such a way that the probability of failure of all additional sealing elements 30a, 30b, 30a', 30b' is kept low because, for example, one material of the cascade has a particularly high temperature resistance and another material has particularly advantageous properties with regard to chemical resistance. In particular, reference is made in this context to the cascade-like arrangement of sealing elements 30a, 30b, 30a', 30b' made of metallic and non-metallic materials in one cascade.

By providing several monitoring chambers 32 in a cascade and by providing monitoring chambers 32 with a large distance between the sealing elements 30a, 30b, 30a', 30b', as for example in the embodiment according to FIGS. 1-6, the probability can be kept low that, due to mechanical damage on the surface of the ball plug 22, such as e.g. scratches, the safety of an operator is put at risk when the lock closure 16 is open. Or, in other words, in this case there is a high probability that a safety problem detected by means of the corresponding monitoring chamber 32 will not occur, i.e. the expected service life of the ball valve is particularly high and the probability of failure is low.

The features of the invention disclosed in the present description, in the drawings as well as in the claims may be essential, both individually and in any combinations, for the realization of the invention in its different embodiments. The invention is not limited to the embodiments described. It may be varied within the scope of the claims and taking into account the knowledge of the competent person skilled in the art.

LIST OF REFERENCE SIGNS 10 valve housing
12 lock chamber
14 opening for locking in as required
16 lock closure
18a main channel inflow section
18b main channel outflow section
20a, 20b connecting piece
22 ball plug
24 through opening
26 actuator
28a, 28b main channel sealing elements
30a, 30b additional sealing elements
30a', 30b' main channel additional sealing elements
32 monitoring chamber
34 metallic seat ring of the right main channel sealing element
36 elastic sealant of the right main channel sealing element, O-ring
38a, 38b metallic seat ring of the rear/downstream additional sealing element 40a, 40b elastic sealant of the rear/downstream additional sealing element, O-ring
42 housing cover
44 guide device
46a, 46b active surfaces of the right main channel sealing element
48a, 48b active surfaces of the rear additional sealing element
50 spring in the right main channel sealing element
52 spring in rear additional sealing element
58 strainer
60 strainer receptacle

The invention claimed is:

1. Ball valve having
a valve housing (10);
a lock chamber (12) for locking in objects or media as required;
a ball plug (22) rotatably mounted in the lock chamber (12), and having a through opening (24) oriented transversely to the axis of rotation and being rotatably arranged via an actuator (26) in such a way that the ball plug (22) can be brought into at least one open position and into at least one closed position;
at least one main channel inflow section (18a) and at least one main channel outflow section (18b) for integrating the ball valve into a fluid line,
wherein the main channel inflow section (18a) and the main channel outflow section (18b), in the open position of the ball plug (22), are connected by the through opening (24) so that flow can pass through them and, in the closed position of the ball plug (22), the main channel inflow section (18a) and the main channel outflow section (18b) are fluidically separated or the flow from the main channel inflow section (18a) into the main channel outflow section (18b) is at least throttled via at least one bypass, while the through opening (24) is accessible from the outside via the lock chamber (12); and
main channel sealing elements (28a, 28b) by means of which, when the ball plug (22) is in the closed position, the lock chamber (12) is sealed off from the main channel inflow section (18a) and the main channel outflow section (18b),
characterized in that
additional sealing elements (30a, 30b, 30a', 30b') are provided in such a way that a monitoring chamber (32) sealed in the closed position of the ball plug (22) is formed within the lock chamber (12) for monitoring proper functioning of the main channel sealing elements (28a, 28b).

2. Ball valve according to claim 1, characterized in that the main channel inflow section (18a), the main channel outflow section (18b) and the lock chamber (12) are arranged in the valve housing (10), wherein the lock chamber (12) is oriented orthogonally to the main channel inflow section (18a) and/or the main channel outflow section (18b).

3. Ball valve according to claim 1, characterized in that the additional sealing elements (30a, 30b, 30a', 30b') are arranged at least in one of the following areas:
in the lock chamber (12),
at the boundary of the lock chamber (12) to the main channel inflow section (28a) and the main channel outflow section (28b).

4. Ball valve according to claim 1, characterized in that monitoring means are provided for monitoring a condition of the monitoring chamber (12).

5. Ball valve according to claim 1, characterized in that the valve housing (10) has a housing cover (42) and/or a lock closure (16) for closing the lock chamber (12).

6. Ball valve according to claim 1, characterized in that the main channel sealing elements (28a, 28b) and/or the additional sealing elements (30a, 30b, 30a', 30b') each have at least one metallic seat ring (38a, 38b) and/or one elastic sealant (40a, 40b).

7. Ball valve according to claim 1, characterized in that the additional sealing elements (30a, 30b, 30a', 30b') are arranged in a movable and/or lockable manner.

8. Ball valve according to claim 1, characterized in that active surfaces (46a, 46b) of the main channel sealing elements (28a, 28b) and/or active surfaces (48a, 48b) of the additional sealing elements (30a, 30b, 30a', 30b') are designed in such a way that a fluid present at these sealing elements (28a, 28b, 30a, 30b, 30a', 30b') exerts a pressure on the active surfaces (46a, 46b, 48a, 48b), which pressure presses the sealing elements (28a, 28b, 30a, 30b, 30a', 30b') against the ball plug (22).

9. Ball valve according to claim 1, characterized in that a first pressure influencing channel is connected to the lock chamber (12), by means of which the lock chamber (12) can be relieved of pressure or pressurized in the closed state of the ball plug (22), and that a second pressure influencing channel is connected to the monitoring chamber (32), by means of which the monitoring chamber (32) can be relieved of pressure or pressurized in the closed state of the ball plug (22).

10. Ball valve according to claim 1, characterized in that at least one of the following elements is provided:
the actuator (26) protruding from the valve housing (26);
a taper in the ball plug (22) formed in the direction of insertion of a pig; and/or a strainer (58) in the through opening (24);
and/or that the ball valve is designed as a pig valve and/or the ball valve is configured for at least one of the following parameter ranges:
nominal width of the fluid line: 0.5" to 56";
pressure in the fluid line: 0.1 to 1,500 bar;
1 temperature of the fluid in the fluid line: −200° C. to +650° C.

* * * * *